(12) United States Patent
deCler et al.

(10) Patent No.: US 6,626,419 B2
(45) Date of Patent: Sep. 30, 2003

(54) FLUID COUPLING VALVE ASSEMBLY

(75) Inventors: Peter deCler, Stillwater, MN (US); Robert K. Johnson, Blaine, MN (US)

(73) Assignee: Colder Products Company, Saint Paul, MN (US)

( * ) Notice: Subject to any disclaimer, the term of this patent is extended or adjusted under 35 U.S.C. 154(b) by 92 days.

(21) Appl. No.: 09/904,944

(22) Filed: Jul. 13, 2001

(65) Prior Publication Data

US 2002/0014608 A1 Feb. 7, 2002

Related U.S. Application Data

(60) Provisional application No. 60/217,993, filed on Jul. 13, 2000.

(51) Int. Cl.[7] .......................... F16K 51/00; F16K 29/00; F16K 37/28
(52) U.S. Cl. ..................................... 251/149.9; 251/345
(58) Field of Search .............................. 251/148, 149.9, 251/311, 367, 904, 343, 344, 345

(56) References Cited

U.S. PATENT DOCUMENTS

| 1,240,161 | A | * | 9/1917 | Olds .......................... 251/149 |
|---|---|---|---|---|
| 4,366,816 | A | * | 1/1983 | Bayard et al. ............... 604/403 |
| 5,004,013 | A | * | 4/1991 | Beaston .................. 137/614.05 |
| 5,050,841 | A | * | 9/1991 | Jacobsson ................. 251/149.9 |
| 5,332,001 | A | * | 7/1994 | Brown .................. 137/614.06 |
| 5,671,777 | A | * | 9/1997 | Allen et al. ............ 137/614.06 |
| 5,902,294 | A | | 5/1999 | Edwards |

FOREIGN PATENT DOCUMENTS

| DE | 89 00 306 | 4/1989 |
|---|---|---|
| DE | 44 14 275 A1 | 10/1995 |
| EP | 0 331 805 A1 | 9/1989 |
| FR | 2 760 507 | 9/1998 |

* cited by examiner

*Primary Examiner*—Edward K. Look
*Assistant Examiner*—John K Fristoe, Jr.
(74) *Attorney, Agent, or Firm*—Merchant & Gould P.C.

(57) ABSTRACT

A fluid coupling valve assembly includes a coupler connected with a closure. The closure includes a closure valve rotatably connected with a closure body. The closure valve is actuatable to open/close the closure to allow/prevent fluid dispensing. The coupler is connected to the closure to transmit fluids to a fluid system.

19 Claims, 10 Drawing Sheets

FLUID COUPLING VALVE ASSEMBLY

This application claims the benefit of U.S. Provisional Application No. 60/217,993 filed Jul. 13, 2000, entitled FLUID COUPLING VALVE ASSEMBLY, and which is in its entirety incorporated herewith by reference.

FIELD OF THE INVENTION

The present invention relates to a fluid coupling valve assembly. More specifically, the present invention relates to a fluid coupling valve assembly for dispensing fluids as well as connecting to a fluid system for fluids transmission.

BACKGROUND OF THE INVENTION

Various fluid coupling valves have been used in connection with fluid dispensing systems, such as "Bag-in box" fluid dispensing systems for controlled dispensing of the fluid. Typically, a coupling valve has a first end and a second end that defines a flow passage therethrough. The first end has a fitment structure for connecting with a fluid dispensing system, and the second end is used for fluid dispensing. The coupling valve is actuatable between an open configuration to allow fluid flow and a closed configuration to prevent fluid flow, by controlling a handle or a lever of the coupling valve.

However, some conventional coupling valves may include many parts each of which is made separately and may be made of different materials. Accordingly, it is difficult to manufacture the valves at a low cost. Some conventional coupling valves, especially with inexpensive valves, often have fluid leaking problems when the valves are in the closed position during operation. In addition, dispensing valves only have dispensing function.

Thus, there is a need for an improved fluid coupling valve assembly with minimum parts, low cost and reliable manner that can be used as a fluid dispenser as well as a connector.

SUMMARY OF THE INVENTION

To overcome the limitations of the related art described above, and to overcome other limitations that will become apparent upon reading and understanding the present specification, this invention is directed to a fluid coupling valve assembly for fluid dispensing and for fluid transmission from a fluid source to a fluid system. The fluid coupling valve assembly includes a coupler and a closure connected to the coupler.

In one embodiment, a fluid coupling valve assembly includes a closure actuatable between an open and closed position, a coupler actuatable between an open and closed position, and a retention mechanism retaining the closure and the coupler in a coupled state. The closure and the coupler can only be separated when each the closure and the coupler is in a closed position.

In one embodiment, the closure can be used by itself for fluid dispensing.

In one embodiment, the closure includes a closure body and a closure valve rotatably connected with the closure body. The closure body has a sleeve portion with a side opening and a fitment extended from a side of the sleeve portion. The fitment is suitable for connecting to a fluid source. The closure valve has a portion within the sleeve portion with an opening corresponding to the side opening. The closure valve further has a lever that rotates the closure valve relative to the closure body between an open configuration in which fluid flow is permitted and a closed configuration in which fluid flow is not permitted. The closure body and the closure valve are each a one-piece, integrally molded structure. The closure body and the closure valve are connected with an interference fit such that force must be applied to the lever in order to rotate the closure valve.

In one embodiment, the coupler has a coupler body with an outlet on a side. An O-ring seal is disposed at one end of the coupler body. A retaining sleeve is disposed within the coupler body to retain the O-ring seal, and has an opening aligned with the outlet. A poppet is disposed within the retaining sleeve with a biasing member therein that retains the poppet in a closed position to prevent fluid flow to the outlet. A cap is provided at the other end of the coupler body to retain the elements, i.e., O-ring seal, retaining sleeve, poppet and biasing member, inside the coupler body. The coupler is actuatable between a first open position in which the poppet is pushed back to retract the biasing member that allows fluid flow to the outlet, and a second closed position (normal position) in which the poppet is biased by the biasing member that prevents fluid flow to the outlet. A sidewall of the poppet blocks fluid flow to the outlet when in the closed position. The coupler may be biased from a closed position to an open position when connected to a closure.

In one embodiment, a retention mechanism prevents the closure from pulling apart from the coupler, while rotating the closure valve to open/close the coupling assembly, and thus to allow/prevent transmitting fluid from a fluid source to a fluid system. The closure and the coupler may be pulled apart when the closure valve lever is in the closed position blocking fluid flow through the closure, and the biasing member biases the poppet in a closed position blocking fluid flow through the coupler. An interlock is provided for increased resistance to movement of the closure valve lever to retain the closure and the coupler in the open position.

In another embodiment, the coupler includes a coupler body and a coupler valve rotatably connected with the coupler body with an interference fit such that force must be applied to rotate the coupler valve relative to the coupler body. The coupler body has a side outlet extending therefrom. The coupler valve has a valve lever that rotates the coupler valve relative to the coupler body between a first position to allow fluid flow to the outlet and a second position to prevent fluid flow to the outlet.

In one embodiment, a retention mechanism prevents the closure from pulling apart from the coupler while rotating the closure valve to open/close the fluid coupling assembly, and thus allow/prevent transmitting fluid from a fluid source to a fluid system. The closure and the coupler may be pulled apart when the closure valve lever and the coupler valve lever both are in closed positions and fluid flow through the assembly is blocked. Also, when coupling the closure with the coupler, the closure lever is engaged into an engagement pocket of the coupler valve lever. Thus, both the closure valve lever and the coupler valve lever rotate simultaneously along a projecting edge of the coupler to open/close the coupling assembly, and thus to allow/prevent transmitting fluid from a fluid source to a fluid system. An interlock is provided to retain the coupling assembly in an open position.

In another embodiment, a fluid dispensing system includes a fluid source, a closure actuatable between an open and closed position, a coupler actuatable between an open or closed configuration. The closure and the coupler include a retention mechanism retaining the closure and the coupler in a coupled state where the closure and the coupler can only be separated when both the closure and the coupler are in a closed position. The coupler may be connected to a part of a fluid system.

A variety of additional advantages of the invention will be set forth in part in the description which follows, and in part will be obvious from the description, or may be learned by practice of the invention. Various advantages of the invention will be realized and attained by means of the elements and combinations particularly point out in the claims. It is to be understood that both the foregoing general description and the following detailed description are exemplary and explanatory only and are not restrictive of the invention.

DESCRIPTION OF THE PREFERRED EMBODIMENT

In the following description of the specific embodiments, reference is made to the accompanying drawings which form a part hereof, and in which is shown by way of illustration the specific embodiments in which the invention may be practiced. It is to be understood that other embodiments may be utilized as structural changes may be made without departing from the scope of the present invention.

This invention provides a fluid coupling valve assembly for fluid dispensing and fluid transmitting from a fluid source to a fluid system. The fluid coupling valve assembly has a closure connected with a coupler.

Figure 1:
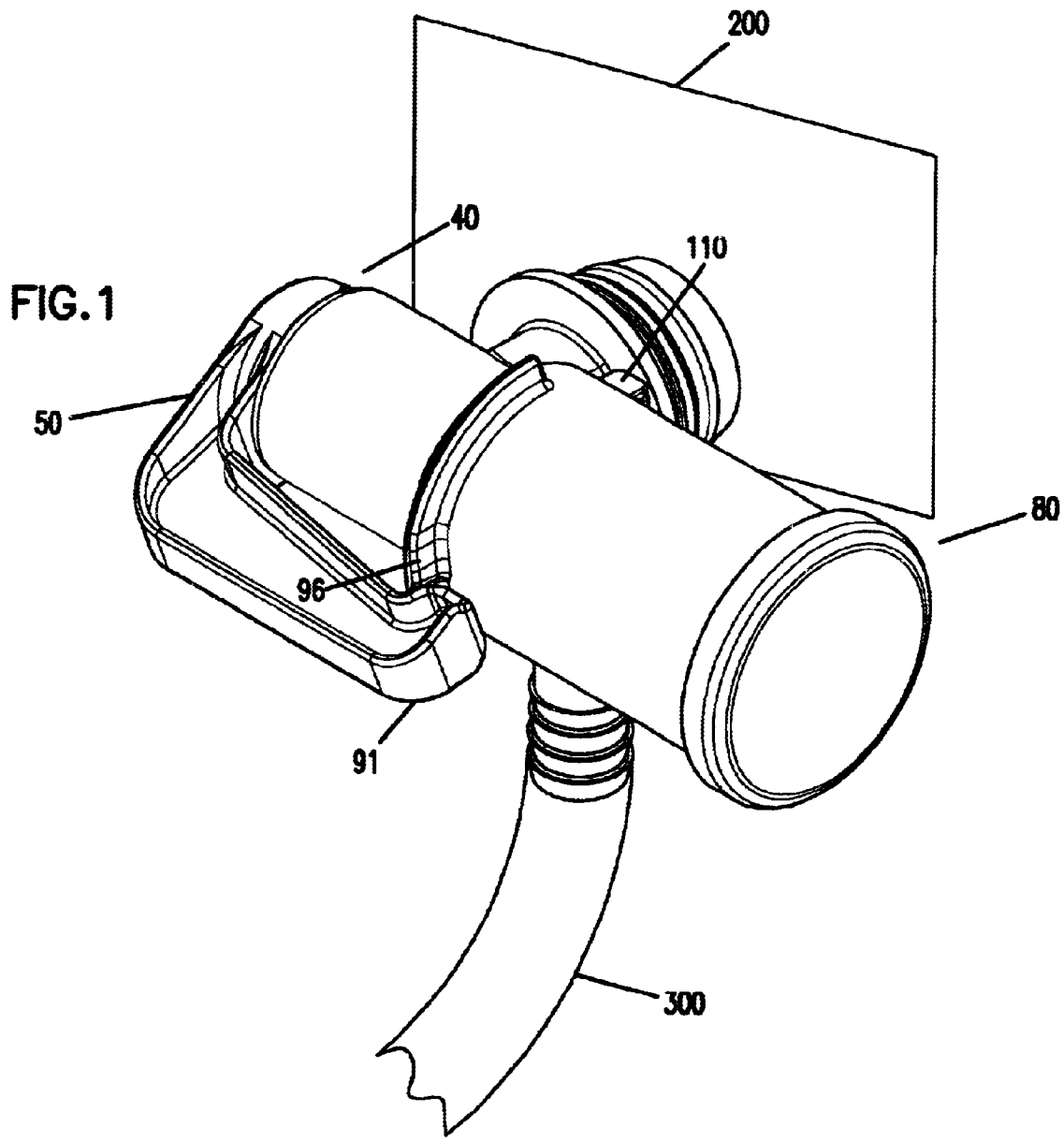
FIG. 1 is a perspective view of a coupling assembly according to one embodiment of the present invention.

FIG. 1 illustrates a coupling valve assembly 40 according to one embodiment of the present invention. The coupling valve assembly 40 includes a closure 50 assembled with a coupler 80. The coupling valve assembly 40 as illustrated in FIG. 1 may be connected to a fluid source 200 which may be but is not limited to a bag or container. The coupling valve assembly may also be connected to a fluid system 300, which may be but is not limited to a fluid line.

Figure 2:
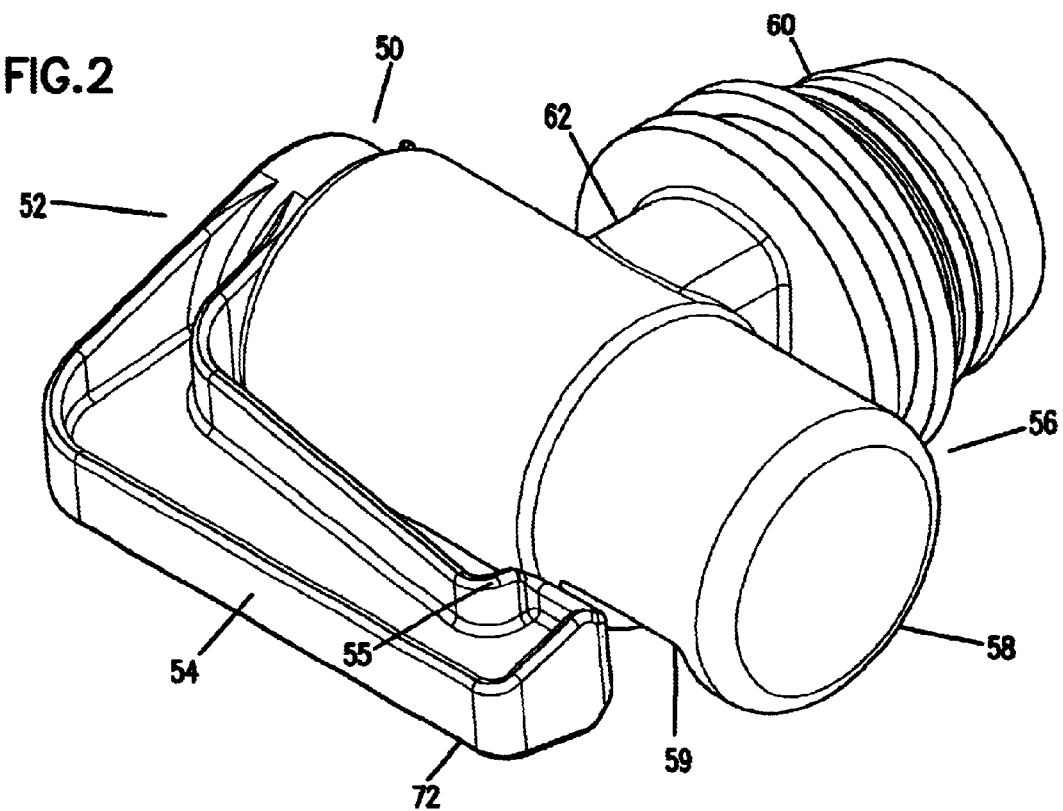
FIG. 2 is a perspective view of a closure according to one embodiment of the present invention.

Turning now to FIG. 2, the closure 50 has a closure valve 52 rotatably connected with a closure body 56. The closure body 56 further includes a sleeve portion 58 connected with the closure valve 52 having a side opening 59, and a fitment 60 extended from the sleeve portion 58 via a tubular part 62. The fitment 60 is suitable for connecting to a fluid source, which may cooperatively fit onto a fitment of a fluid source, and/or form the fitment on the fluid source so as to be integral with the fluid source. The closure valve 52 further has a tubular portion rotatably received in the sleeve portion 58 with an opening (not shown) that corresponds to the side opening 59 of the sleeve portion 58, and a closure valve lever 54 that is actuatable to rotate the closure valve 52 relative to the closure body 56 between an open configuration wherein the openings of the sleeve portion 58 and the closure valve 52 are aligned and a closed configuration wherein the openings of the sleeve portion 58 and the closure valve 52 are not aligned, such that a wall of the tubular portion blocks the opening 59 of the sleeve portion 58. The closure lever 54 has an end 72 with a protrusion 55, the function of which will be discussed below. The closure valve 52 and the closure body 56 have an interference fit with each other. Further, the closure valve 52 and the closure body 56 are each a one-piece, integrally molded structure, which can be made of plastic, such as low-density polyethylene. However, it is to be understood that other lightweight, fluid-resistant materials also can be used for the closure valve 52 and the closure body 56.

Figure 3:
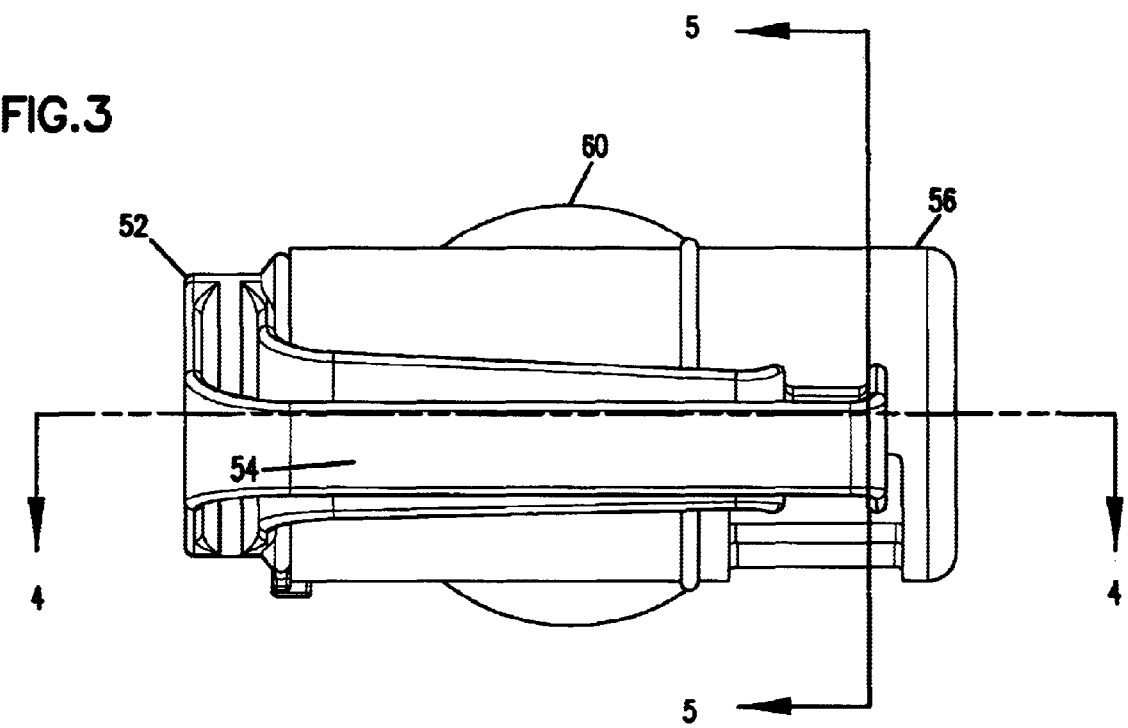
FIG. 3 is a front view of the closure of FIG. 2 according to one embodiment of the present invention.
Figure 4:
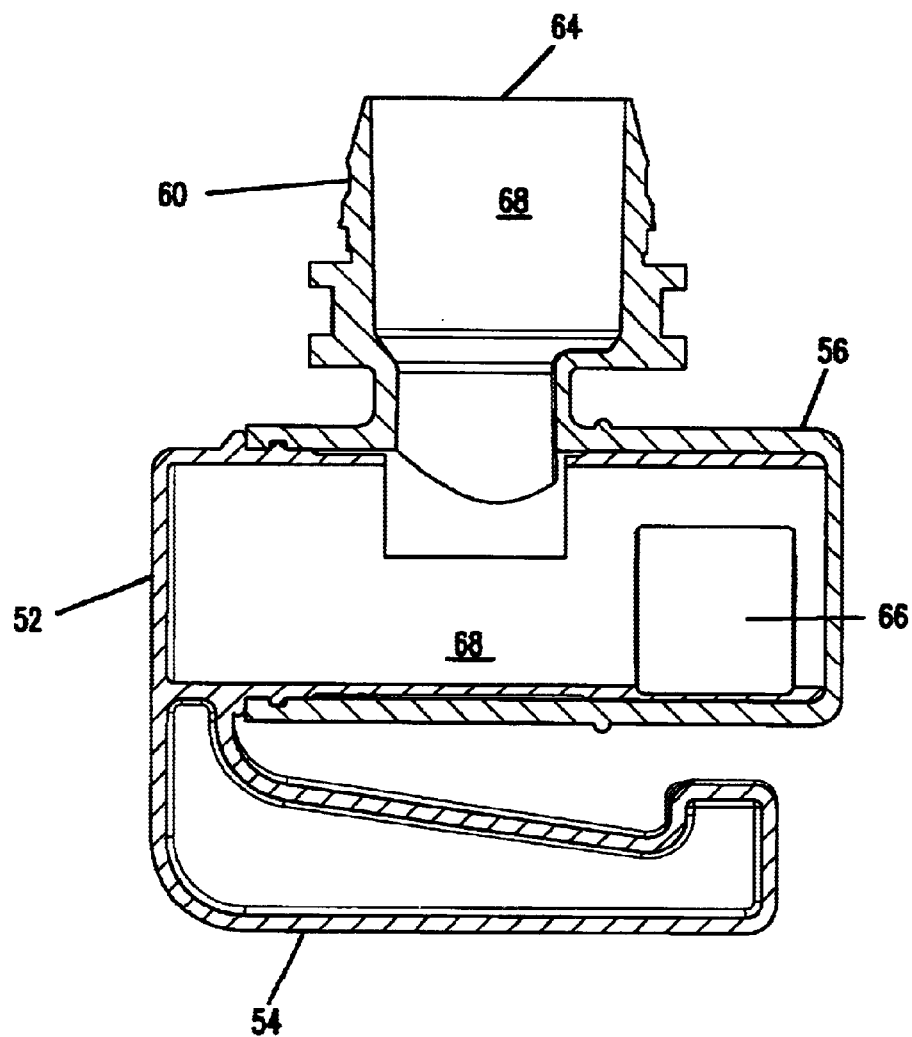
FIG. 4 is a cross-sectional view of the closure along line 4—4 of FIG. 3 according to one embodiment of the present invention.
Figure 5:
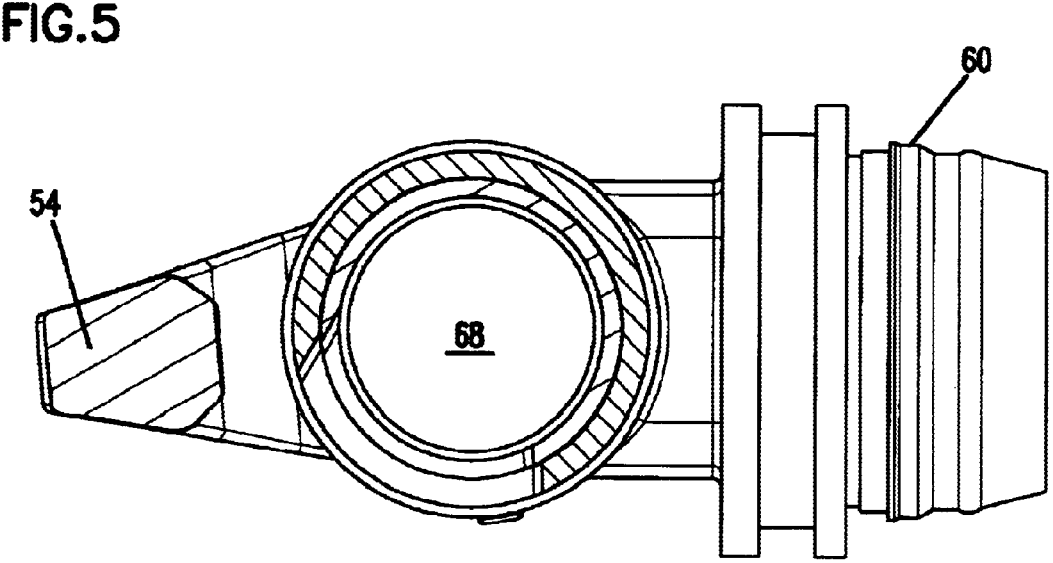
FIG. 5 is a cross-sectional view of the closure along line 5—5 of FIG. 3 according to one embodiment of the present invention.

When the closure valve 52 has a position relative to the closure body 56 as shown in FIGS. 3–5, a flow passage 68 is open to allow fluid dispensing. At this position, the side opening 59 of the closure body 56 is aligned with the opening of the closure valve 52, fluid from a fluid source enters the flow passage 68 via a first opening 64, and dispenses from a second opening 66. Upon turning the closure valve 52 to a position that the opening of the closure valve 52 blocks the side opening 59 of the closure body 56, fluid is trapped within the closure 50 and the flow passage 68 is closed.

The closure 50 can be used as a dispenser in food products, cleaning solutions, detergents, etc., for fluid dispensing. It will be appreciated that the closure 50 can be used by itself without the coupler 80 when dispensing fluids directly from a container, one example of a container being a bag in a box type container.

Figure 6:
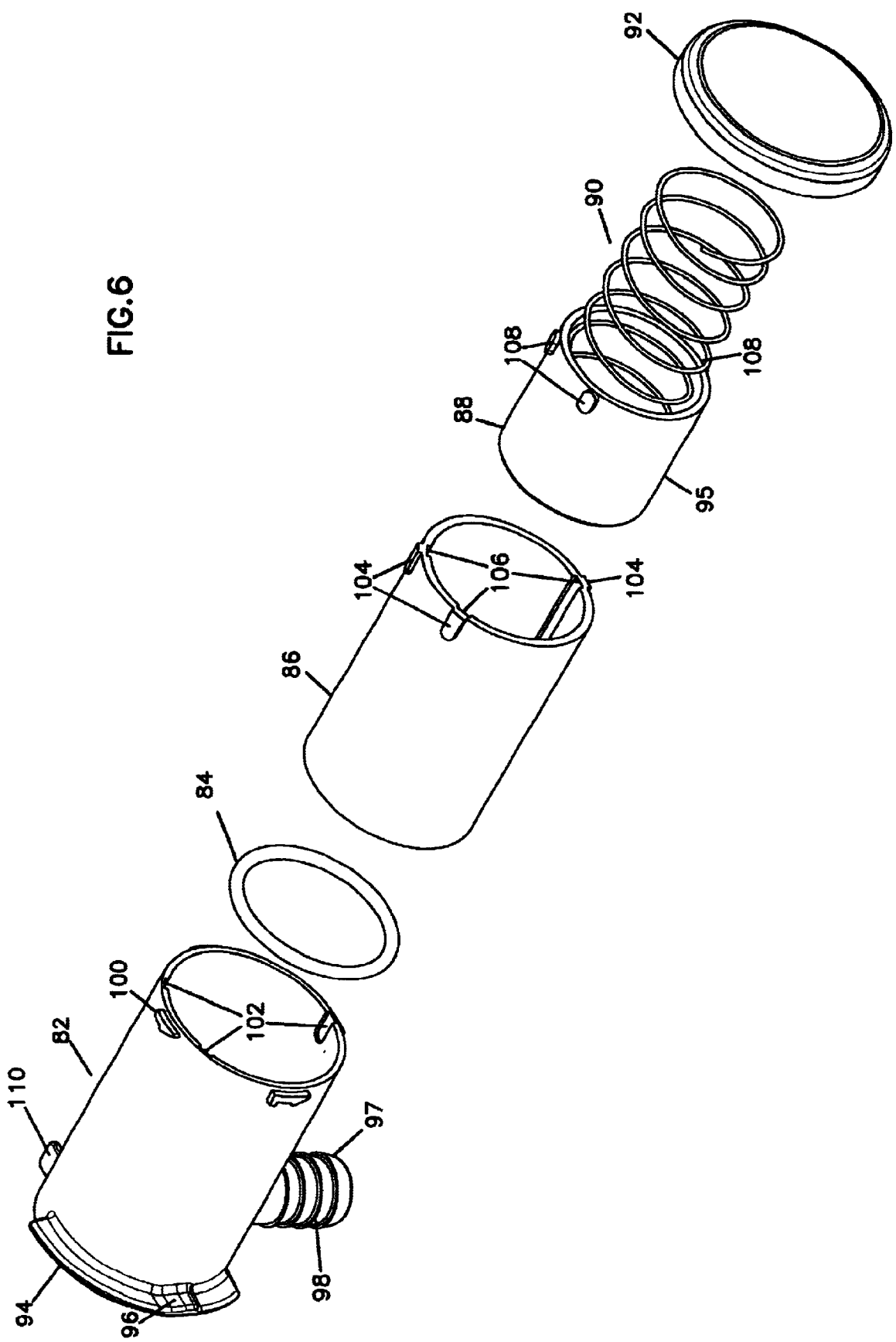
FIG. 6 is a perspective view showing the elements of a coupler in exploded relationship to one another according to one embodiment of the present invention.

Referring now to FIG. 6, there is shown elements of a coupler 80 in exploded relationship according to one embodiment of the present invention. The coupler 80 includes a coupler body 82 having a projecting edge 94 with an interlock 96 thereon, an outlet 98 for connecting to a fluid system, and at least one stop member 110 for providing proper orientation between the coupler 80 and the closure 50. The interlock 96 may be but is not limited to a recess or detent located on the projecting edge 94. An O-ring rubber seal 84 is disposed therein at one end. A retaining sleeve 86 is disposed within the coupler body 82 to retain the O-ring seal 84. The retaining sleeve 86 has an opening 93 (see FIG. 8) aligned with the outlet 98. The retaining sleeve 86 further has at least one retention member 104 that fits groove 102 for securing the retaining sleeve 86 within the coupler body 82. The retention members 104 and the grooves 102 may be asymmetrically positioned such that the coupler body 82 and the retaining sleeve 86 are properly connected and opening 93 and outlet 98 may align. A poppet 88 is disposed within the retaining sleeve 86 with a biasing member 90 (such as spring) therein for biasing the poppet 88 in a position to block fluid flow to the outlet 98. The poppet 88 may have at least one retention member 108 that fits elongated grooves 106 of the retaining sleeve 86 allowing the poppet 88 to slide along an inner surface of the retaining sleeve 86. A snap-on cap 92 is provided to retain the O-ring seal 84, the retaining sleeve 86, the poppet 88 and the biasing member 90 within the coupler body 82. The coupler 80 is actuatable between an open position when the poppet 88 is pushed to allow fluid flow to the outlet 98, and a closed position when the poppet 88 is biased by the biasing member 90 to prevent fluid flow to the outlet 98. A sidewall 95 (shown in FIG. 8) blocks fluid flow through the coupler 80 when in the closed position. The outlet 98 may have a barbed end 97 for connecting to a fluid system.

The coupler 80 may be actuated in the open position when connected to a part such as a closure wherein the closure pushes the poppet member 88 to allow fluid flow through the coupler 80. The coupler 80 is normally in a closed position when uncoupled from a closure, as the biasing member 90 biases the coupler 80 into a closed position where the sidewall 95 blocks the outlet 98.

Figure 7:
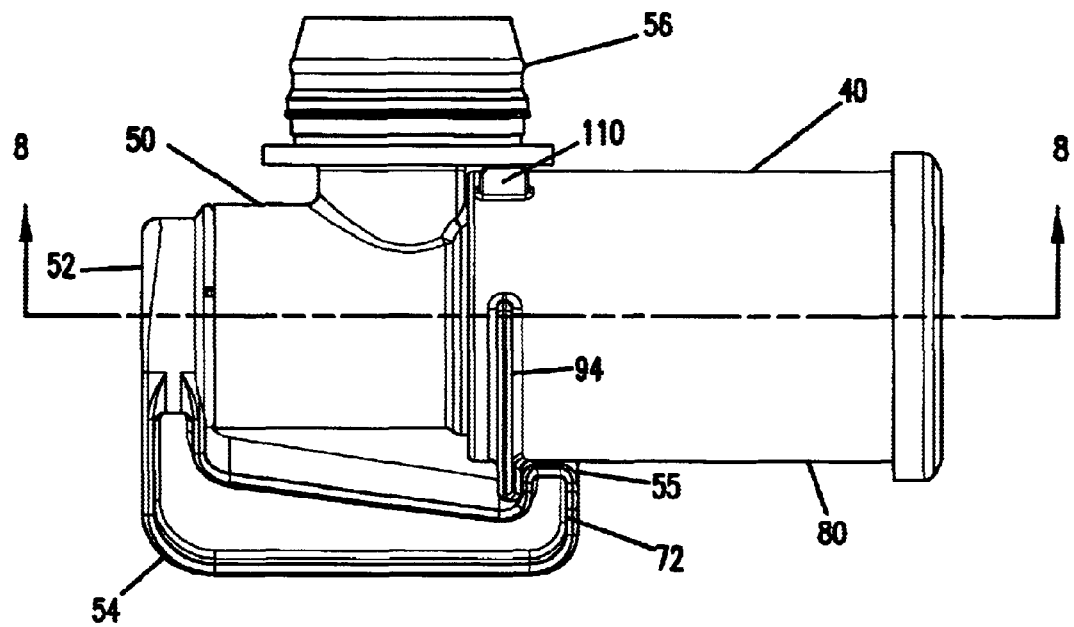
FIG. 7 is a front view of the coupling assembly shown in FIG. 1 according to one embodiment of the present invention.
Figure 8:
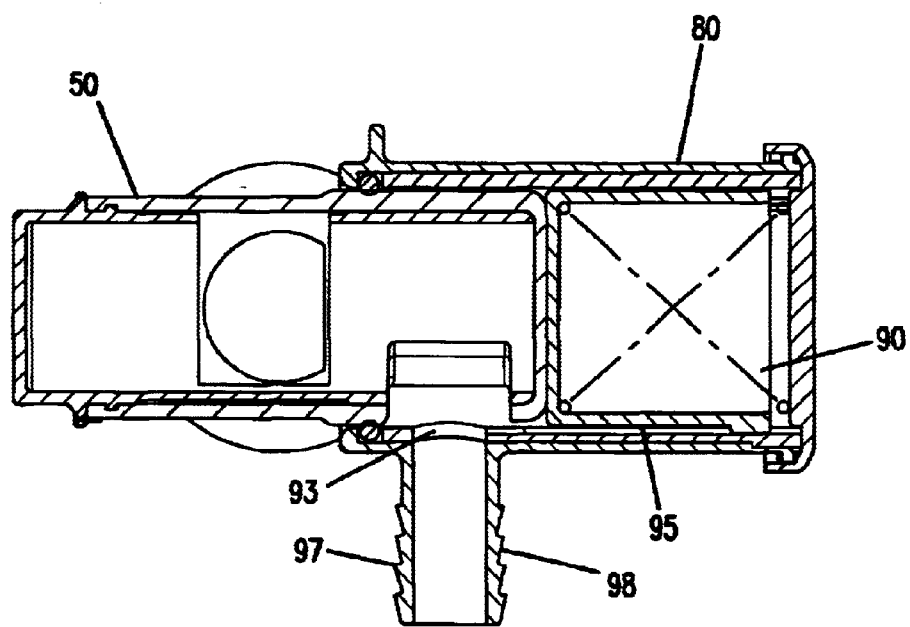
FIG. 8 is a cross-sectional view of the coupling assembly along line 8—8 of FIG. 7 according to one embodiment of the present invention.

When the closure 50 is connected with the coupler 80 as shown in FIGS. 1 and 7–8, the at least one stop member 110 is positioned to provide proper orientation between the coupler 80 and the closure 50. The fluid coupling assembly 40 has a retention mechanism 91 where the closure lever 54 communicates with and is in contact with the projecting edge 94. The closure valve lever 54 having the end 72 with the protrusion 55 is engaged to the projecting edge 94 retaining connection between the closure 50 and the coupler 80 and preventing the closure 50 from pulling apart from the coupler 80, while rotating the closure valve 52 to open/close the coupling valve assembly 40 for permitting/preventing fluid flow to the outlet 98. When the closure 50 is connected to the coupler 80, the closure 50 pushes the poppet 88 retracting the biasing member 90 such that the coupler 80 may be actuated into the open position. The closure 50 may be rotated by its closure valve lever 54 actuating the closure into the open position. In the open position, the opening 66 of the closure 50 is aligned with the opening of the retaining sleeve 86, so as to be aligned with the outlet 98. The closure 50 and the coupler 80 may be pulled apart when the closure valve lever 54 is in the closed position blocking fluid flow through the closure 50, and the biasing member 90 biases the poppet 88 in a closed position blocking fluid flow through the coupler 80. The interlock 96 releasably locks the closure 50 and the coupler 80 in an open position, and is provided to prevent accidental movement of the closure valve 52 from the open position, such as may occur during handling. In the embodiment shown, the interlock 96 engages the valve lever end 72 to provide increased resistance to movement of the valve lever 54 from the open position. The interlock 96 as illustrated may be but is not limited to a recess or detent.

Figure 9:
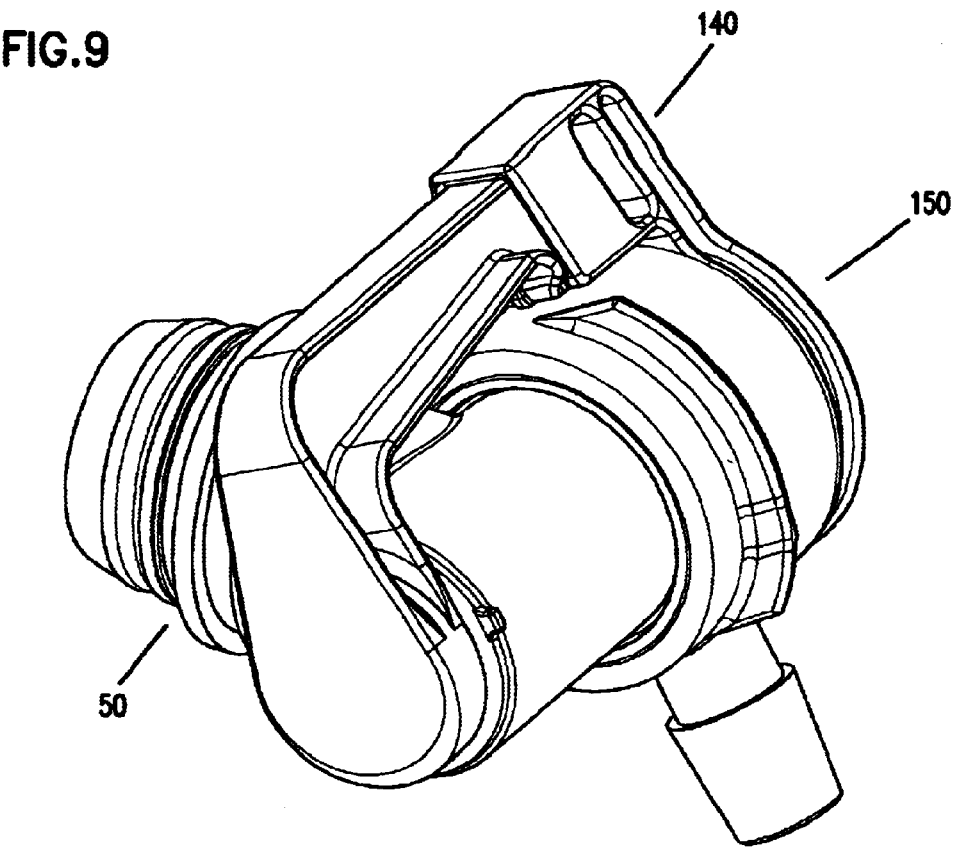
FIG. 9 is a perspective view of a coupling assembly in a closed position according to another embodiment of the present invention.
Figure 10:
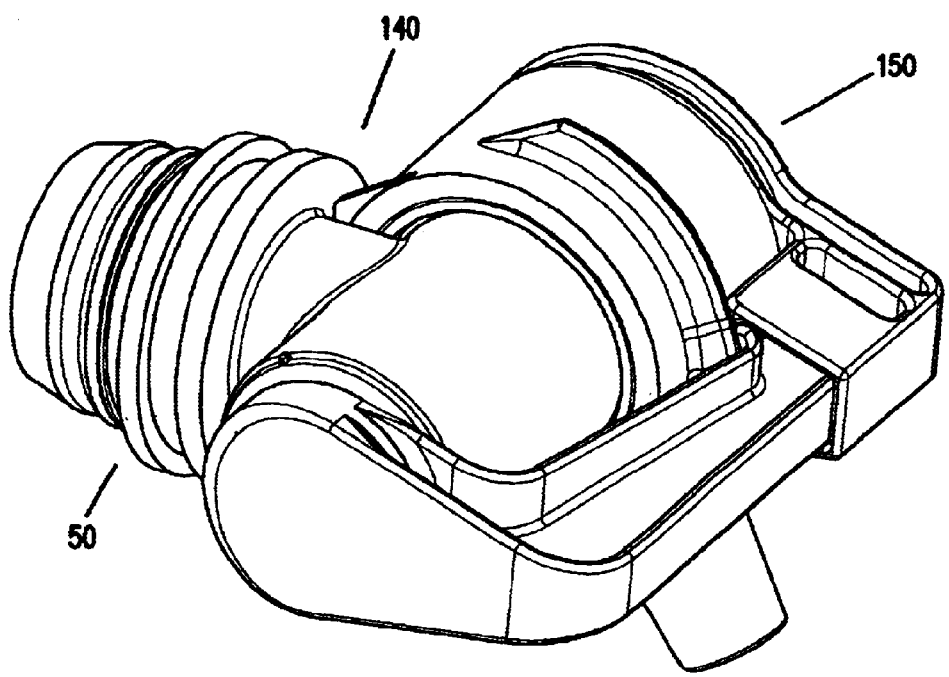
FIG. 10 is a perspective view of the coupling assembly in an open position according to another embodiment of the present invention.

FIGS. 9 and 10 show a coupling valve assembly 140 according to another embodiment of the present invention. FIG. 9 shows the coupling assembly 140 in a closed position, and FIG. 10 shows the coupling assembly 140 in an open position. The coupling assembly 140 mainly has a closure 50 and a coupler 150. As the closure 50 has the same structure as that of the previous embodiment, no detailed description will be provided herein.

Figure 11:
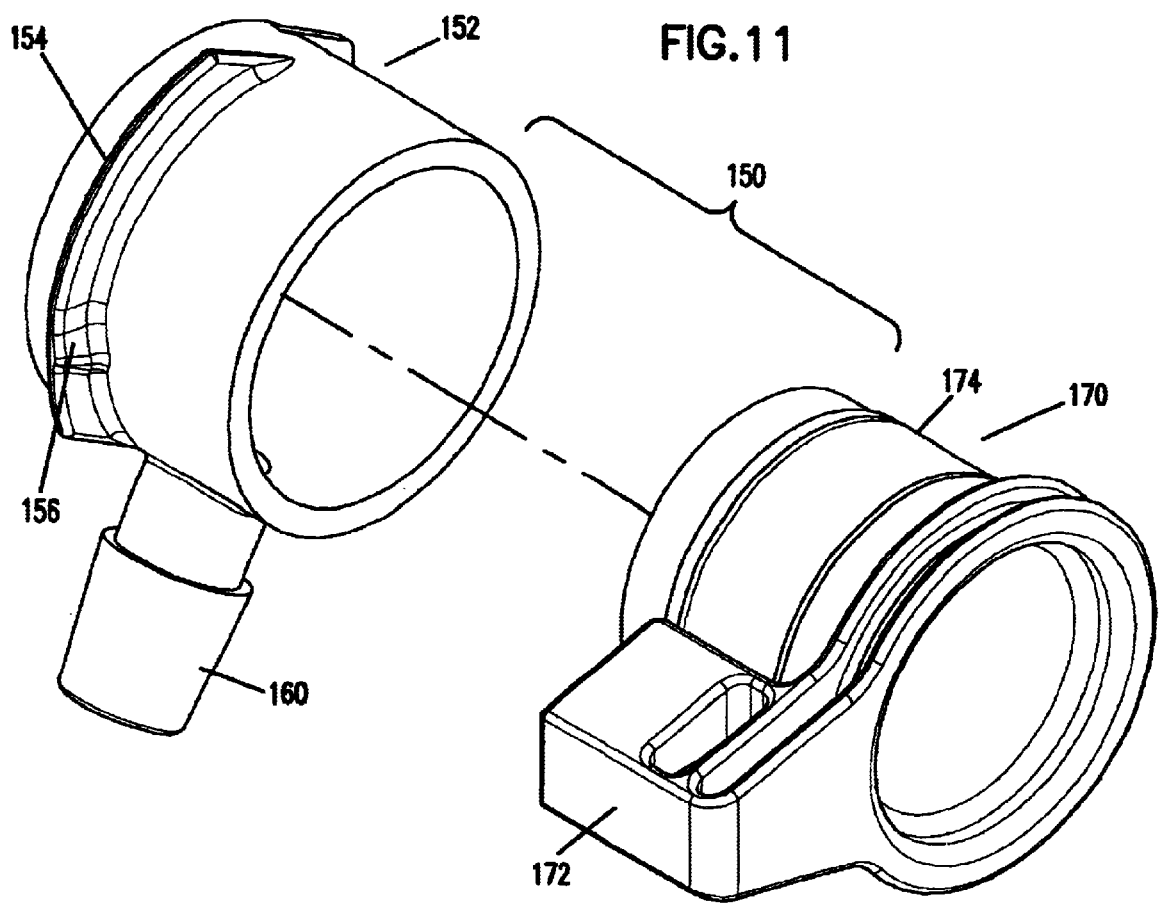
FIG. 11 is a perspective view showing the elements of a coupler in exploded relationship to one another according to another embodiment of the present invention.
Figure 12:
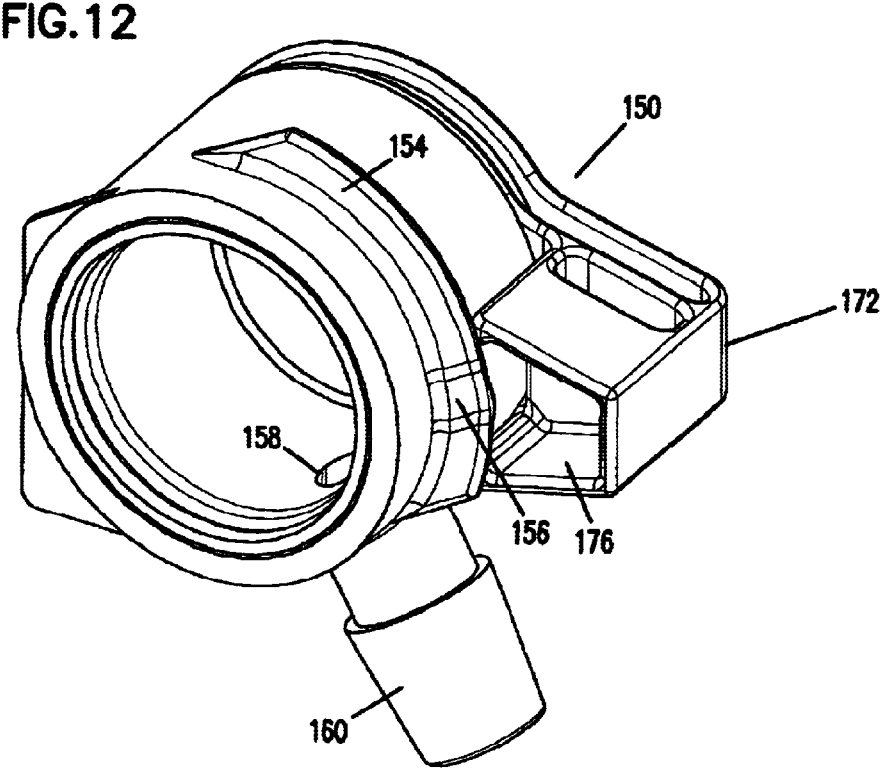
FIG. 12 is a perspective view of the assembled coupler according to another embodiment of the present invention.
Figure 15:
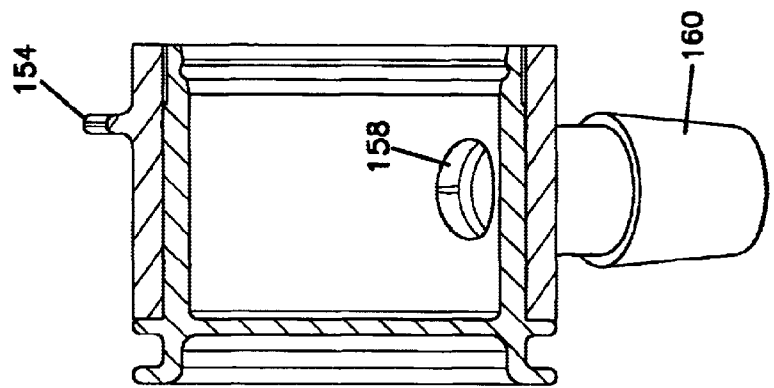
FIG. 15 is a cross-sectional view of the coupler along line 15—15 of FIG. 14 according to another embodiment of the present invention.
Figure 14:
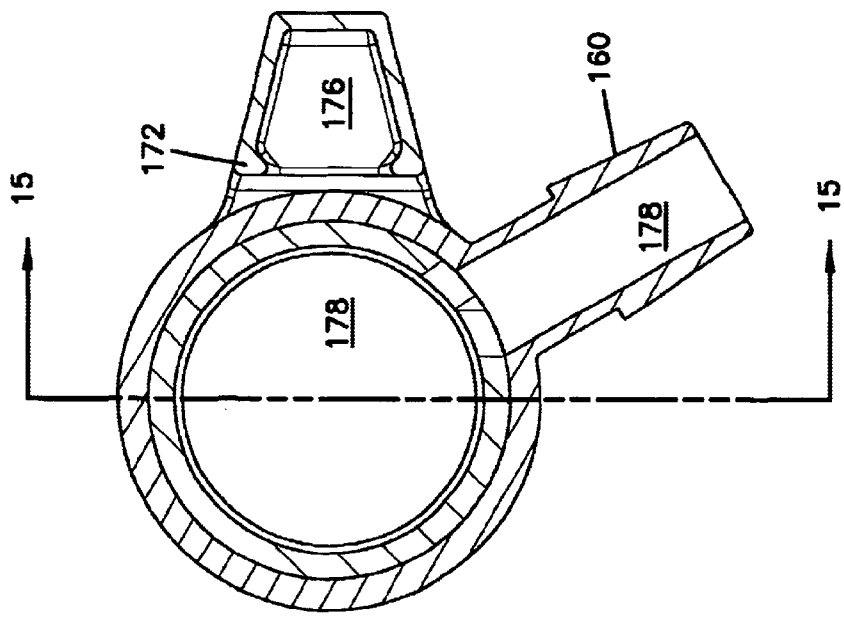
FIG. 14 is a cross-sectional view of the coupler along line 14—14 of FIG. 13 according to another embodiment of the present invention.
Figure 13:
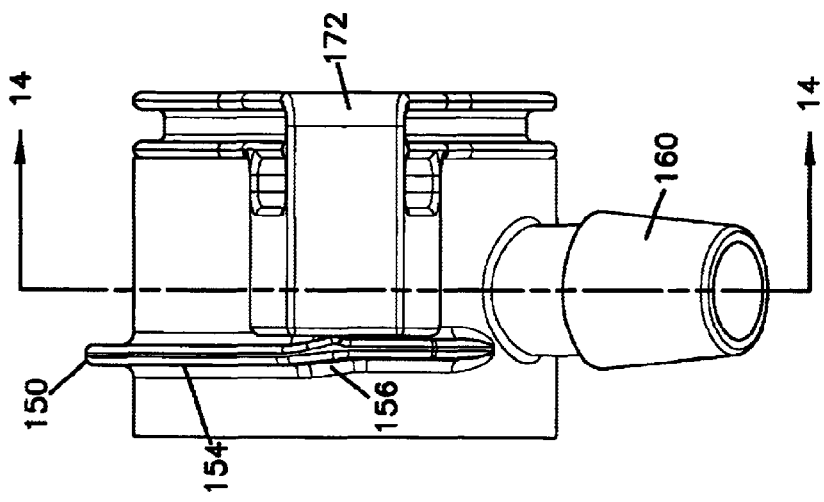
FIG. 13 is a front view of the coupler according to another embodiment of the present invention.

As shown in FIGS. 11 and 12, the coupler 150 has a coupler valve 170 rotatably connected with a coupler body 152. The coupler body 152 and the coupler valve 170 are in an interference fit. The coupler body 152 further includes outlet 160, a projecting edge 154 and an interlock 156. The coupler valve 170 further has a valve lever 172 for actuating the coupler valve 170 and a valve body 174 rotatably disposed within the coupler body 152 with a side opening 158 (see FIG. 15) corresponding to the outlet 160. As seen in FIG. 12, the valve lever 172 has an engagement pocket 176 for engaging with the closure valve 52. The coupler valve 170 is actuatable between an open position in which the side opening 158 is aligned with the outlet 160, and a closed position in which the outlet 160 is blocked. A flow passage 178 is formed within the coupler 150 as seen in FIGS. 13–15. By actuating the coupler valve 170, the flow passage 178 either is open to allow fluid flow to the outlet 160, or is closed to prevent fluid flow to the outlet 160.

Figure 16:
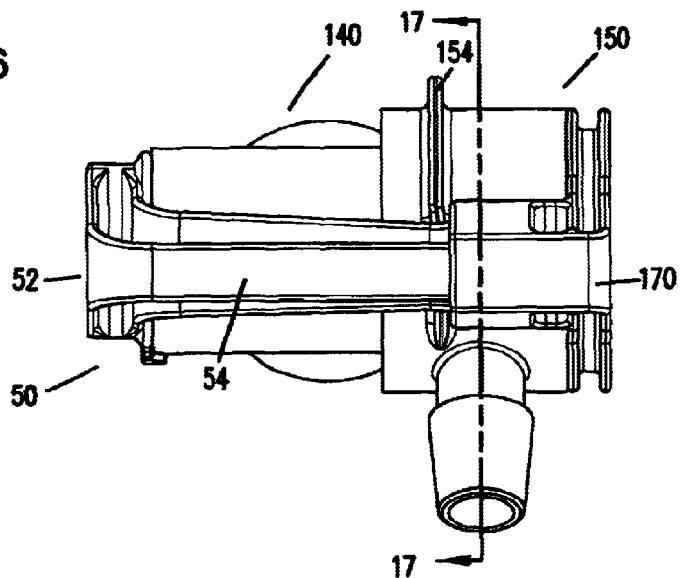
FIG. 16 is a front view of the coupling assembly in the open position according to another embodiment of the present invention.
Figure 17:
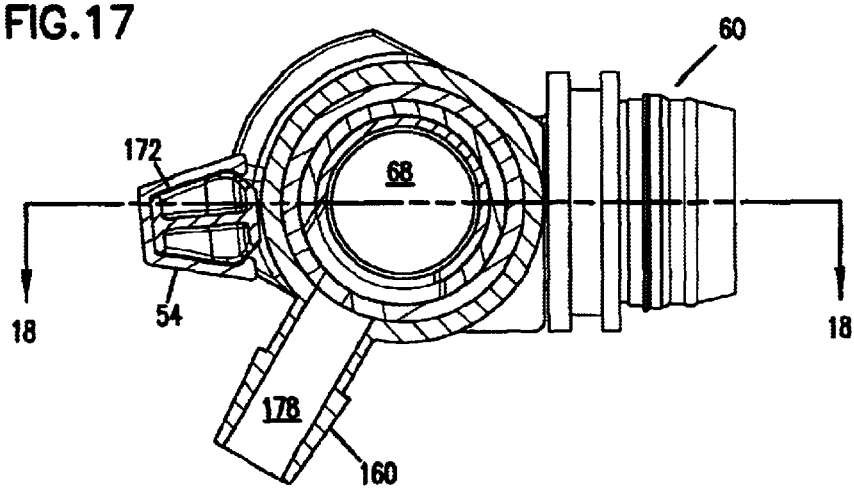
FIG. 17 is a cross-sectional view of the coupling assembly along line 17—17 of FIG. 16 according to another embodiment of the present invention.
Figure 18:
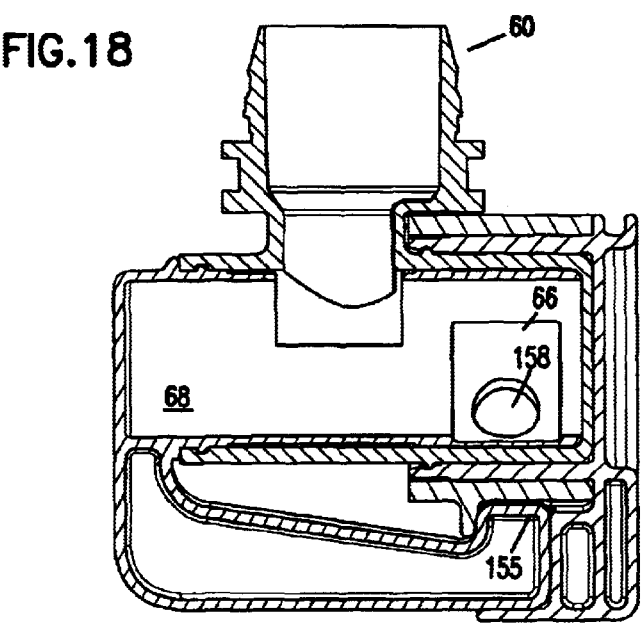
FIG. 18 is a cross-sectional view of the coupling assembly along line 18—18 of FIG. 17 according to another embodiment of the present invention.
Figure 19:
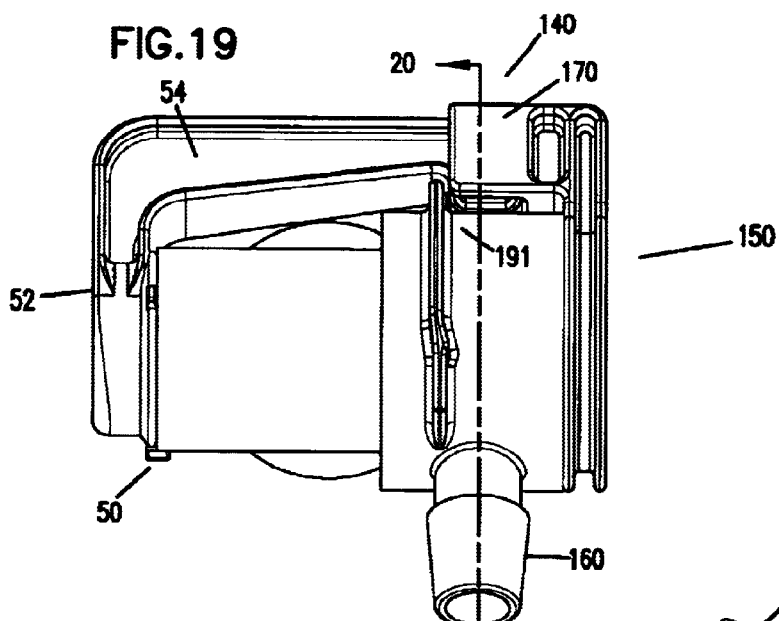
FIG. 19 is a front view of the coupling assembly in the closed position according to another embodiment of the present invention.
Figure 20:
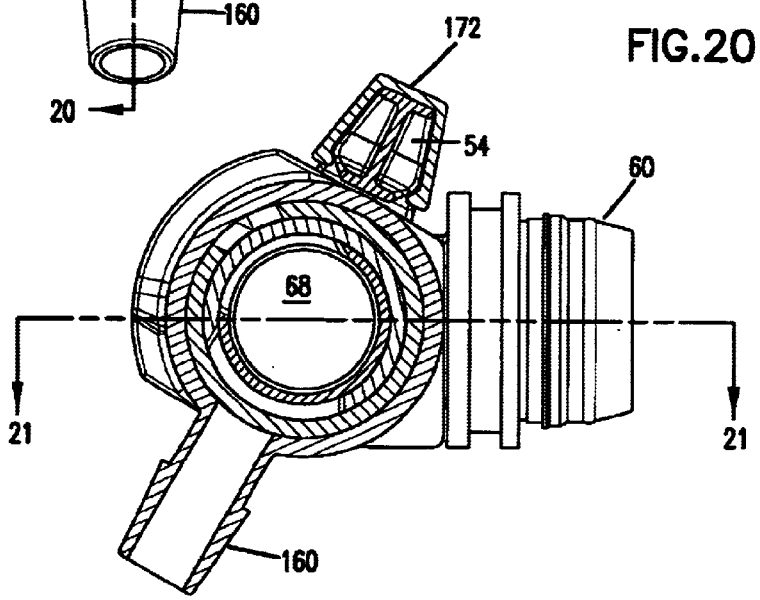
FIG. 20 is a cross-sectional view of the coupling assembly along line 20—20 of FIG. 19 according to another embodiment of the present invention.
Figure 21:
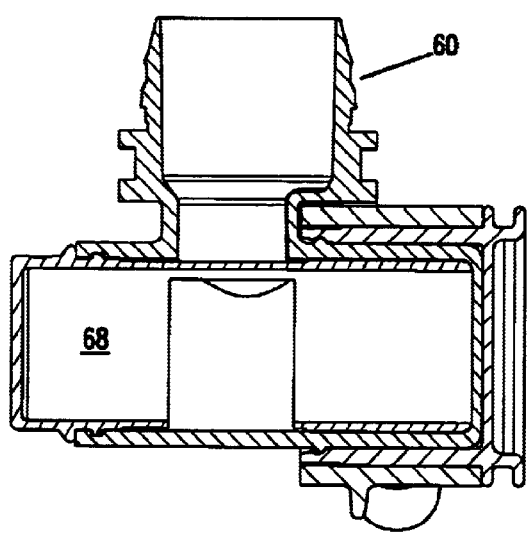
FIG. 21 is a cross-sectional view of the coupling assembly along line 21—21 of FIG. 20 according to another embodiment of the present invention.

When the coupler 150 is connected with the closure 50 as shown in FIGS. 16–21, the closure valve 52 is engaged with the coupler valve 170 via the engagement pocket 176, and thus both the closure valve 52 and the coupler valve 170 are actuated simultaneously and rotated along the projecting edge 154 to open/close the coupling assembly 140. The fluid coupling assembly 140 has a retention mechanism 191 where the projecting edge 154 may be in communication and contact with a protrusion 155 of the closure valve lever. The projecting edge 154 retains a connection between the closure 50 and the coupler 150, and prevents the closure 50 and the coupler 150 from pulling apart. The interlock 156 releasably locks the closure 50 and the coupler 150 in an open position, and is provided to prevent accidentally moving the valves (closure valve 52 and the coupler valve 170) from the open position, such as may occur during handling. As above, the interlock as illustrated may be but is not limited to a recess or detent. When the coupling assembly 140 is in the open position, as seen in FIGS. 16–18, fluids pass flow passages 68 and 178 to the outlet 160. When the coupling assembly 140 is in the closed position, as seen in FIGS. 19–21, fluids are trapped within the closure 50 and the flow passage 68 is closed.

The coupling assembly of the present invention can be used as dispenser and a connector for transmitting fluids from a fluid source to a fluid system. As discussed above, the retaining and interlock features provide reliability in connection and function of the coupling assembly. Further, the fluid coupling valve assembly provides the advantage of an assembly that is cost efficient and includes a minimum of parts.

The foregoing description of the preferred embodiments of the invention has been presented for the purposes of illustration and description. It is no intended to be exhaustive or to limit the invention to the precise form disclosed. Many modifications and variations are possible in light of the above teaching.

What is claimed is:

1. A fluid coupling valve assembly comprising:
   a closure actuatable between an open and a closed position;
   a coupler actuatable between an open and a closed position; the coupler being rotatably connected to the closure; and
   the closure and the coupler including a retention mechanism retaining the closure and the coupler in a coupled state; the retention mechanism including the closure having a closure handle including an end, said end is a protruding end, and including the coupler having a projection edge thereon said coupler; the protruding end and the projection edge are in communication rotating the fluid coupling valve assembly in a open or closed position, wherein the coupler and the closure can only be separated when both the closure and the coupler are in a closed position.

2. The fluid coupling valve assembly according to claim 1, wherein the closure comprises a closure body and a closure valve, wherein the closure body and the closure valve are rotatably connected to each other, the closure body having a sleeve portion with an opening and a fitment extended outwardly from a side of the sleeve portion, the closure valve having an opening corresponding to the opening of the sleeve portion of the closure body, and a closure handle, wherein the closure handle rotates the closure valve relative to the closure body between an open configuration and a closed configuration.

3. The fluid coupling valve assembly according to claim 2;
   wherein the fitment is attached to a fluid source.

4. The fluid coupling valve assembly according to claim 1, wherein the coupler comprises an interlock releasably locking the closure and the coupler in an open position.

5. The fluid coupling valve assembly according to claim 4, wherein the interlock comprises a recess or detent.

6. The fluid coupling valve assembly according to claim 2, wherein the closure body and the closure valve form an interference fit.

7. The fluid coupling valve assembly according to claim 2, wherein the closure body and the closure valve are each a one-piece, integrally molded structure.

8. The fluid coupling valve assembly according to claim 1, wherein the coupler comprises an coupler body and an outlet.

9. The fluid coupling valve assembly according to claim 8, wherein the outlet is attached to a fluid system.

10. The fluid coupling valve assembly according to claim 8, wherein the coupler comprises a retaining sleeve disposed within the coupler body and including an opening aligned with the outlet.

11. The fluid coupling valve assembly according to claim 10, wherein a poppet is disposed within the retaining sleeve, and a biasing member that biases the poppet in a position to block fluid flow to the outlet of the coupler body when the coupler is not connected to the closure.

12. The fluid coupling valve assembly according to claim 11, wherein the poppet member is pushed retracting the biasing member when the coupler is connected to the closure such that fluid flow is not blocked to the outlet of the coupler body.

13. The fluid coupling valve assembly according to claim 11, wherein the biasing member is a spring.

14. A method of dispensing fluids comprising:
    providing a closure, wherein the closure includes a closure body and a closure valve, wherein the closure body and the closure valve are rotatably connected to each other, the closure body having a sleeve portion with an opening and a fitment extended outwardly from a side of the sleeve portion, the closure valve having an opening corresponding to the opening of the sleeve portion of the closure body, and a closure handle, wherein the closure handle rotates the closure valve relative to the closure body between an open configuration and a closed configuration and providing a coupler, wherein the coupler includes a coupler body and a coupler valve, wherein the coupler body and the coupler valve are rotatably connected to each other, the coupler body having a projecting edge and an opening extended from a side of the coupler body, the coupler valve having an opening corresponding to the opening of the coupler body and a coupler valve handle, wherein the coupler valve handle rotates the closure valve relative to the coupler body between an open configuration and a closed configuration, and the coupler valve handle having an engagement pocket;
    connecting the closure and the coupler, wherein the engagement pocket of the coupler valve handle engages the closure handle connecting the closure and the coupler;
    attaching the closure to a fluid source and attaching the coupler to a fluid system;
    simultaneously rotating the closure handle and the coupler valve handle, thereby actuating an open or a closed configuration of both the closure and the coupler to permit or prevent dispensing of a fluid;
    retaining connection between the closure and the coupler through an end of the closure handle engaged to the projecting edge of the coupler, thereby preventing the closure and coupler from pulling apart while rotating the closure and the coupler to the open or the closed configuration; and
    interlocking the closure handle and the coupler valve handle through an interlock on the projecting edge engaged to the end of the closure handle.

15. The method according to claim 14, wherein simultaneously rotating the closure handle and the coupler valve handle includes rotating the closure handle of the closure valve relative to the closure body and applying a force to the closure handle.

16. The method according to claim 14, wherein simultaneously rotating the closure handle and the coupler valve handle includes rotating the coupler valve handle of the coupler valve relative to the coupler body and applying a force to the coupler valve handle.

17. The method according to claim 14, wherein interlocking the closure handle and the coupler handle includes increasing resistance to movement of the engaged closure handle and coupler valve handle.

18. A fluid coupling valve assembly comprising:
    a closure including a closure body and a closure valve, wherein the closure body and the closure valve are rotatably connected to each other, the closure body having a sleeve portion with an opening and a fitment extended outwardly from a side of the sleeve portion, the closure valve having an opening corresponding to the opening of the sleeve portion of the closure body, and a closure handle, wherein the closure handle rotates the closure valve relative to the closure body between an open configuration and a closed configuration; and a coupler including a coupler body and a coupler valve, wherein the coupler body and the coupler valve are rotatably connected to each other, the coupler body having a projecting edge and an opening extended from a side of the coupler body, the coupler valve having an opening corresponding to the opening of the coupler body and a coupler valve handle, wherein the coupler valve handle rotates the coupler valve relative to the coupler body between an open configuration and a closed configuration, and the coupler valve handle having an engagement pocket, wherein the engagement pocket of the coupler valve handle engages the closure handle connecting the closure and the coupler; and wherein the closure handle and the coupler valve handle rotate simultaneously in an open or close configuration.

19. A fluid dispensing system comprising:

a fluid source;

a coupling valve assembly including a closure actuatable between an open and a closed position and a coupler actuatable between an open and a closed position, the coupler being rotatably connected to the closure, the closure and the coupler including a retention mechanism retaining the closure and the coupler in a coupled state; the retention mechanism including the closure having a closure handle including an end, said end is a protruding end, and including the coupler having a projection edge thereon said coupler; the protruding end and the projection edge are in communication rotating the fluid coupling valve assembly in a open or closed position, wherein the coupler and the closure can only be separated when both the closure and the coupler are in a closed position; and a fluid line attached to the coupler.

* * * * *